No. 615,297. Patented Dec. 6, 1898.
J. A. MOSHER.
PHOTOGRAPHIC SHUTTER.
(Application filed July 11, 1898.)
(No Model.)
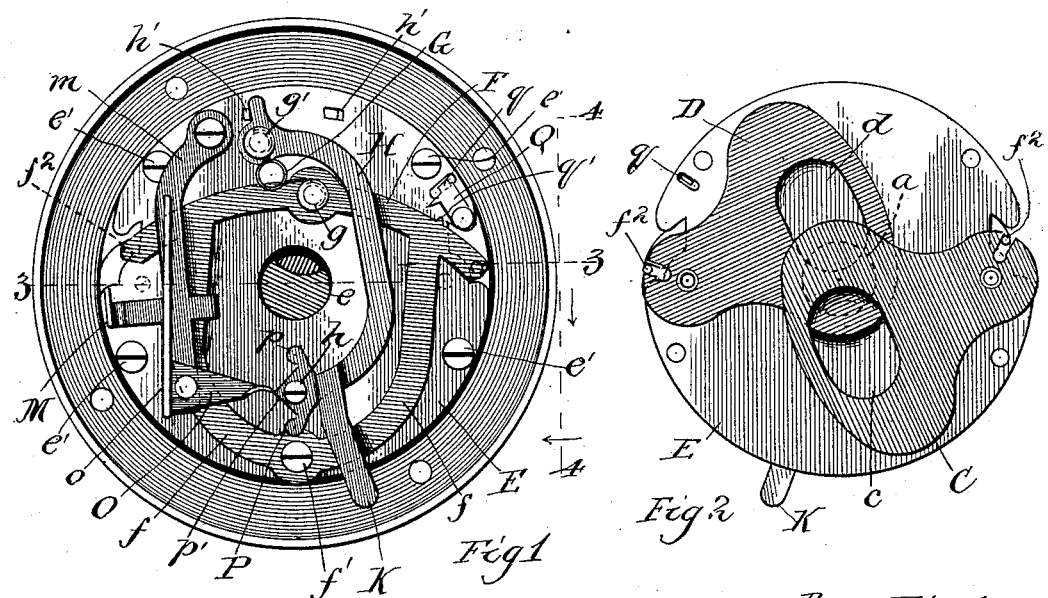
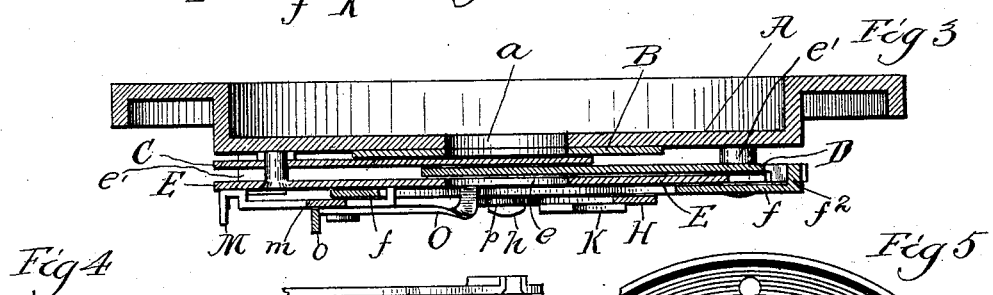
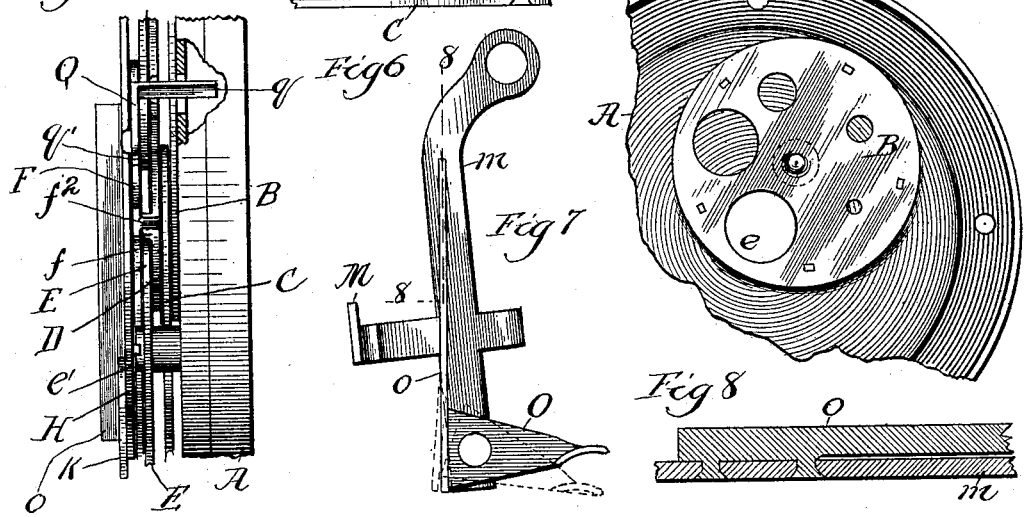
Witnesses
W. C. Coolies
Paul Synnestvedt
Inventor:
John A. Mosher
By Louis N. Gilson Atty.

UNITED STATES PATENT OFFICE.

JOHN A. MOSHER, OF CHICAGO, ILLINOIS, ASSIGNOR TO THE ADAMS & WESTLAKE COMPANY, OF SAME PLACE.

PHOTOGRAPHIC SHUTTER.

SPECIFICATION forming part of Letters Patent No. 615,297, dated December 6, 1898.

Application filed July 11, 1898. Serial No. 685,662. (No model.)

*To all whom it may concern:*

Be it known that I, JOHN A. MOSHER, a citizen of the United States of America, and a resident of Chicago, county of Cook, and State of Illinois, have invented certain new and useful Improvements in Photographic Shutters, of which the following is a specification and which are fully illustrated in the accompanying drawings.

The objects of the invention are to secure a shutter which shall be compact, light, and efficient, which is operative without preliminary setting and from either position of rest, and which may be actuated, if desired, by a push-button always moving in one direction in throwing the shutter. These various objects are attained by means of the construction hereinafter fully described and which is illustrated in the accompanying drawings, in which—

Figure 1 is an elevation of the inner face of the shutter mechanism. Fig. 2 is an elevation of the shutter-plates and their supporting-plate. Fig. 3 is a sectional view on the line 3 3 of Fig. 1. Fig. 4 is an edge view, partly broken away, on the line 4 4 of Fig. 1. Fig. 5 is a detail elevation of the inner face of the front plate of the shutter-case. Fig. 6 is a detail of one of the shutter-plates. Fig. 7 is a detail of the actuating-lever, and Fig. 8 is a sectional view on the line 8 8 of Fig. 7.

The front plate of the case of the shutter is shown at A and has an aperture $a$, preferably central as to the plate, for the admission of light to the interior of the camera. A diaphragm-plate B is pivoted to the inner face of the plate A, having suitable apertures of differing sizes which are capable of being brought successively into registry with the aperture $a$. A back plate E, having an aperture $e$, corresponding in position with the aperture $a$, is secured to but spaced apart from the rearward face of the plate A by means of the screws $e'$. A pair of shutter-plates C D are pivotally secured between the plates A E. Each of the shutter-plates is provided with an aperture, as $c$ $d$, which registers with the aperture $a$ as the plate is oscillated. These apertures of the shutter-plates should be of as great diameter as the aperture $a$ and may be made oblong, as shown, their ends being preferably rounded. Each of the plates is substantially segmental in form and has an opaque portion at each side of its aperture. The shutter-plates are pivoted upon opposite sides of the aperture $a$, as shown. Their pivotal points are diametrically opposite. The plates are so mounted that they reciprocate in opposite directions, and when they are at rest they overlap so as to cover the aperture $a$, and the aperture of each plate may extend partly across the aperture $a$, so that the latter aperture is opened almost at the commencement of the movement of the shutter-plates. By rounding the ends of the apertures of the shutter-plates the opening for the admission of light is from the center of the aperture $a$ to its circumference, and the closing of this aperture is from the circumference to the center.

The shutter-plates C D are actuated by means of a reciprocating bar F, carried by a yoke $f$, which includes the light-admitting aperture, and is pivoted at $f'$ upon the back of the inner plate E. The bar F has its ends turned downwardly, as indicated at $f^2$, so as to pass through suitable recesses in the plate E and engage suitable slots in the heels of the plates C D. The reciprocation of the bar F is accomplished by means of a spring G, preferably U-shaped and having a coil at its bow, one end of which is attached to a pin $g$, fixed to the bar F, and the other end of which is attached to a pin $g'$, fixed to a lever-arm H, which is pivoted at $h$ to the back face of the plate E. The movement of the bar F is limited by the dimensions of the recesses in plate E, through which its ends $f^2$ project. The movement of the lever-arm H is between stops $h'$ $h'$, projecting from the face of the plate E, and the length of the stroke of each of the parts F H is such that measured from the pivot-point $f'$ the pin $g'$ moves through a wider angle than does the pin $g$—that is to say, the path of the pin $g'$ overlaps at each end the path of the pin $g$, thereby reversing the direction of pressure of the spring G, as it tends to expand during each stroke.

The lever-arm H may be actuated by means of an arm K, rigidly fixed thereto, and when so actuated the arm K must be moved alternately in opposite directions. Instead of this to-and-fro movement the shutter mechanism may be actuated by means of a thumb-piece M, attached to or acting upon a lever-arm m, pivoted to the plate E and pivotally carrying a thrust-rod O, which is normally held in a substantially perpendicular relation to the arm m by means of a leaf-spring o, fixed to the latter arm and bearing against the flattened or squared heel of the rod O. The forward end of the latter rod is adapted to bear against the arm H alternately upon opposite sides of its pivot-point h, and for the purpose of this contact the arm may be provided with lugs P p. The free end of the rod O is normally in line with the pivot h and is diverted toward one or the other of the lugs P p by a V-shaped cam p', projecting toward it between these lugs.

In order to effect a time exposure, a detent is thrown so as to intercept the bar F and arrest its movement when the apertures of the shutter-plates have uncovered the aperture a. This detent consists of an arm Q, pivoted to the rearward face of the plate E and controlled by an outwardly-turned end q, which passes through suitable apertures in the plates E A, so that the arm Q may be thrown to intercept a lug q', projecting from the bar F. This arresting mechanism may be greatly varied in form.

The operation of the shutter is as follows: The parts being in the position shown in Fig. 1, pressure may be applied to the thumb-piece M to move it inwardly or to the right. As the thrust-rod O is thereby advanced it is deflected by the cam p' toward the lug p, this angular movement forcing the spring o backwardly. The pressure of the rod O upon the lug p swings the upper end of the arm H to the right, thereby compressing the spring G until the pin g' passes the radius drawn from the point f' to the point g, when the direction of pressure of the spring is reversed and it throws the bar F to the left, thereby causing the oscillation in opposite directions of the shutter-plates C D. Pressure upon the thumb-piece M being relieved, the spring o causes the backward movement of the arm m by its pressure of the free end of the rod O against the inclined face of the cam p', and as the apex of this cam has been thrown upwardly by the movement of the arm H the end of the rod passes it as it reaches the limit of its backward movement, so that next the inthrust of the thumb-piece M brings the end of the rod O into contact with the opposite face of the cam p', thereby directing it to the lug P and causing the movement of the shutter-plates in the opposite direction. Should reliance be placed upon the arm K for actuating the shutter, it is thrown to the left when the parts are in the position shown in Fig. 1 and to the right when they are in the reverse of that position.

When the shutter mechanism is set for time exposure, the movement of the arm H in one direction opens the shutter and in the other direction closes it, the shutter remaining open until the arm is actuated the second time.

I claim as my invention—

1. In a photographic shutter, the combination with an apertured plate A, and a pair of oscillating apertured shutter-plates pivoted on opposite sides of the aperture of the plate A, the apertures of the shutter-plates being adapted to coincide at the aperture of the plate A, of a reciprocating bar engaging both shutter-plates, a reciprocating actuating-piece, and a spring attached to the bar and to the actuating-piece, the range of movement of the actuating-piece being such that the direction of the spring-pressure is reversed after the spring has been brought to tension.

2. In a photographic shutter, the combination with a pair of oscillating apertured plates having their apertures so disposed that they register as the plates oscillate, of means for simultaneously throwing such plates in opposite directions, an automatically-retracted push-button for actuating such throwing means, and means for reversing the direction of such throwing means at each successive advance of the push-button.

3. In a photographic shutter, the combination with an apertured plate A, and a pair of oscillating plates pivoted upon opposite sides of the aperture of the plate A and overlapping the same, each of such plates having an aperture so disposed as to register with the aperture of the plate A, mechanism for simultaneously throwing such oscillating plates in opposite directions, an automatically-retracted push-button for actuating the plate-throwing mechanism, and means for reversing the direction of movement of the throwing mechanism at each successive advance of the button.

4. In a photographic shutter, the combination with an apertured plate A, and a pair of oscillating apertured shutter-plates pivoted on opposite sides of the aperture of the plate A, the apertures of the shutter-plates coinciding at the aperture of the plate A, of a reciprocating bar engaging the heel portions of both shutter-plates, a reciprocating actuating-piece, and an expansion-spring connecting the actuating-piece with the bar.

5. In a photographic shutter, the combination with an oscillating shutter-plate, of a swinging arm for oscillating the shutter, a V-cam projecting laterally from the arm at its pivot, a thrust-rod coöperating with the cam and adapted to swing the arm, such rod having its rearward end flattened or squared, a swinging arm for pivotally carrying the thrust-rod, a leaf-spring carried by the arm and bearing upon the squared end of the thrust-rod, and a push-piece for swinging such last-named arm.

6. In a photographic shutter, the combination with the apertured plate A, the oscillating shutter-plates C, D, having their pivots upon opposite sides of the aperture of the plate A, and each having an aperture located so as to register with the aperture of such plate, the bar F having its ends in engagement with the heel portions of the shutter-plates, a pivoted yoke carrying the bar F, a swinging arm H, an expansion-spring connecting the bar and arm, stops for the bar and the arm and being so disposed that the angular movement of the arm is greater than that of the bar as measured from the pivot of the yoke, a V-cam projecting laterally from the arm H at its pivot, a thrust-rod for swinging the arm H and disposed so as to engage the oblique edges of the cam, such thrust-rod having its rearward end squared, a swinging arm pivotally carrying the thrust-rod, and a leaf-spring fixed to such last-named arm and bearing upon the squared back of the thrust-rod.

JOHN A. MOSHER.

Witnesses:
  LOUIS K. GILLSON,
  HESTER B. BAIRD.